(12) United States Patent
Yu et al.

(10) Patent No.: US 9,949,134 B2
(45) Date of Patent: Apr. 17, 2018

(54) METHOD AND SYSTEM FOR PROVIDING SERVICE FROM TDD CELL TO TERMINAL

(75) Inventors: Xiaoqian Yu, Shenzhen (CN); Yada Huang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 650 days.

(21) Appl. No.: 14/000,175

(22) PCT Filed: Feb. 17, 2012

(86) PCT No.: PCT/CN2012/071292
§ 371 (c)(1),
(2), (4) Date: Aug. 16, 2013

(87) PCT Pub. No.: WO2012/110006
PCT Pub. Date: Aug. 23, 2012

(65) Prior Publication Data
US 2013/0322308 A1    Dec. 5, 2013

(30) Foreign Application Priority Data
Feb. 18, 2011  (CN) .......................... 2011 1 0040570

(51) Int. Cl.
H04W 16/14    (2009.01)
H04W 28/18    (2009.01)

(52) U.S. Cl.
CPC .......... *H04W 16/14* (2013.01); *H04W 28/18* (2013.01)

(58) Field of Classification Search
None
See application file for complete search history.

(56) References Cited

U.S. PATENT DOCUMENTS

| 7,890,113 B2 | 2/2011 | Jones |
| 2006/0221872 A1 | 10/2006 | Jones |

(Continued)

FOREIGN PATENT DOCUMENTS

| CN | 1748377 A | 3/2006 |
| CN | 101631316 A | 1/2010 |

(Continued)

OTHER PUBLICATIONS

International Search Report in international application No. PCT/CN2012/071292, dated May 24, 2012.

(Continued)

*Primary Examiner* — Ayaz Sheikh
*Assistant Examiner* — Sori Aga
(74) *Attorney, Agent, or Firm* — Oppedahl Patent Law Firm LLC

(57) ABSTRACT

The disclosure discloses a method for providing a service from a Time Division Duplex (TDD) cell to a terminal, which includes: configuring a cell of which frequency bands can interfere a Frequency Division Duplex (FDD) uplink frequency band and a cell of which frequency bands can interfere an FDD downlink frequency band in cells provided by an eNB as an uplink cell only for transmitting uplink data and a downlink cell only for transmitting downlink data respectively on an eNB of a TDD system in advance, and storing configuration information of the uplink and downlink cells in the eNB; transmitting the configuration information of the uplink and downlink cells to a UE by the eNB; receiving, by the UE, the configuration information of the uplink and downlink cells, and transmitting data with the eNB by at least one of the uplink and downlink cells. The disclosure further discloses a system for providing a service from a TDD cell to a terminal, so as to not only avoid interference between the frequency bands of the FDD and (Continued)

TDD systems and implement coexistence of the FDD and TDD systems, but also fully utilize spectrum resources, ensure the high utilization rate of the spectrum resources and save resources.

25 Claims, 4 Drawing Sheets

(56) References Cited

U.S. PATENT DOCUMENTS

| | | | |
|---|---|---|---|
| 2007/0286156 A1* | 12/2007 | Gormley | H04B 7/2615 370/350 |
| 2009/0252203 A1 | 10/2009 | Goldhamer | |
| 2010/0002608 A1 | 1/2010 | Goldhamer | |
| 2010/0265847 A1 | 10/2010 | Lee | |
| 2010/0272017 A1* | 10/2010 | Terry | H04W 48/12 370/328 |
| 2010/0290369 A1 | 11/2010 | Hui | |
| 2011/0090826 A1 | 4/2011 | Jones | |
| 2011/0286370 A1 | 11/2011 | Tang | |
| 2013/0343244 A1 | 12/2013 | Hui et al. | |
| 2014/0161021 A1 | 6/2014 | Goldhamer | |
| 2016/0365938 A1 | 12/2016 | Hui et al. | |

FOREIGN PATENT DOCUMENTS

| | | | |
|---|---|---|---|
| CN | 101729125 A | | 6/2010 |
| CN | 101778392 A | | 7/2010 |
| EP | 2244412 A2 | | 10/2010 |
| WO | 2010045752 A1 | | 4/2010 |
| WO | WO/2010/078835 | * | 8/2010 |

OTHER PUBLICATIONS

English Translation of the Written Opinion of the International Search Authority in international application No. PCT/CN2012/071292, dated May 24, 2012.

Supplementary European Search Report in European application No. 12746806.4, dated Mar. 29, 2017.

* cited by examiner

Fig. 5

```
A cell of which frequency bands can interfere an FDD uplink frequency band
    and a cell of which frequency bands can interfere an FDD downlink
   frequency band in cells provided by an eNB are respectively configured as
    an uplink cell only for transmitting uplink data and a downlink cell only for    501
   transmitting downlink data on the eNB of a TDD system, and configuration
    information of the uplink and downlink cells is stored in the eNB; the eNB
    transmits the configuration information of the uplink and downlink cells to a
                                      UE
```

```
   The UE receives the configuration information of the uplink and downlink       502
   cells and transmits data with the eNB by at least one of the uplink and the
                                 downlink cells
```

Fig. 6

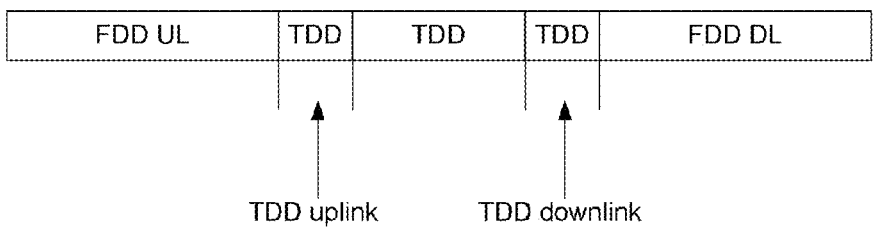

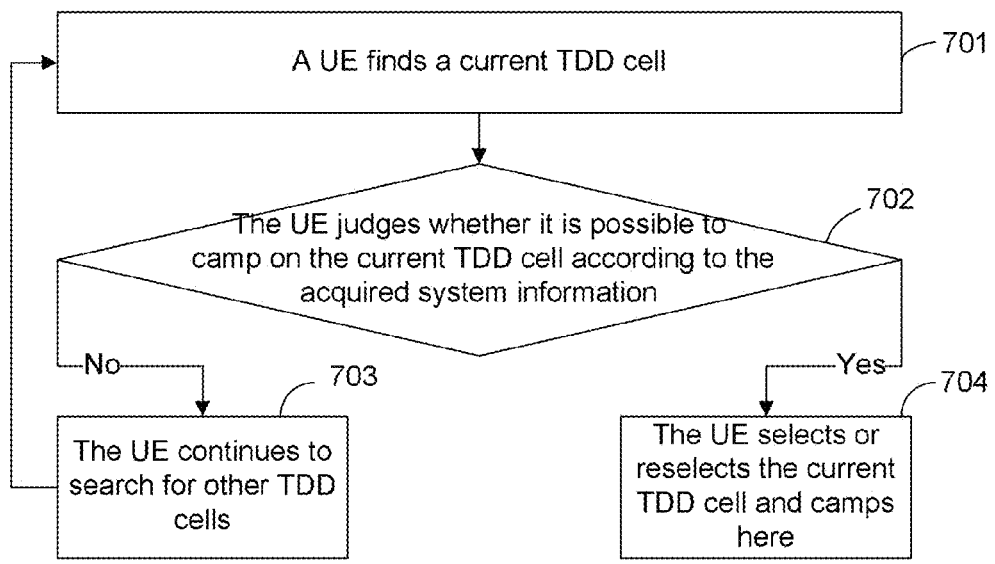

METHOD AND SYSTEM FOR PROVIDING SERVICE FROM TDD CELL TO TERMINAL

TECHNICAL FIELD

The disclosure relates to coexistence technology for a Frequency Division Duplex (FDD) system and a Time Division Duplex (TDD) system of Long Term Evolution (LTE), in particular to a method and a system for providing a service from a TDD cell to a terminal.

BACKGROUND

LTE technology has two duplex modes: FDD and TDD. In the FDD mode, a User Equipment (UE) performs uplink transmission and downlink reception at an uplink frequency band and a downlink frequency band respectively, so that the uplink transmission and downlink reception can be performed at the same time. In the TDD mode, the UE performs uplink transmission and downlink reception at different time respectively, so that the uplink transmission and downlink reception cannot be performed at the same time. The spectrum resources of the LTE are mainly of 2,500 to 2,690 MHz, as shown in FIG. 1, the uplink frequency band of LTE FDD is of 2,500 to 2,570 MHz, the downlink frequency band of LTE FDD is of 2,620 to 2,690 MHz, and the frequency band of LTE TDD is of 2,570 to 2,620 MHz.

With the development of radio technology, the FDD&TDD hybrid scheme of the LTE is the mainstream planning scheme in the planning process of a network, so that the network coverage of FDD and TDD may coexist in the same area. If the LTE FDD system and LTE TDD system coexist, the coexistence of adjacent frequency bands will become a primary problem to be solved.

When the LTE FDD system and the LTE TDD system coexist, the adjacent frequency bands between the two systems may be interfered due to out of band emission, spurious emissions and the like as the two systems work at adjacent frequency bands, thereby affecting the network performance. For example, as shown in the scenario in FIG. 2, there are two evolved NodeBs (eNBs) in total, eNB_1 and eNB_2, which cover cell 1 (Cell_1) and cell 2 (Cell_2) in an FDD mode and a TDD mode respectively, wherein Cell_1 and Cell_2 provide a service to UE_1 and UE_2 respectively, the coverage areas of eNB_1 and eNB_2 are somewhat overlapped and both UE_1 and UE_2 are located at the overlapped part of the coverage areas, as in such, if the working frequency bands of eNB_1 and eNB_2 are adjacent, there will be interference between the adjacent frequency bands, specifically, if the TDD working frequency band of eNB_2 is adjacent to the FDD uplink frequency band of eNB_1, the downlink data of eNB_2 may interfere the uplink reception of eNB_1 due to out of band emission and other reasons, namely, the transmission of eNB_2 interferes the reception of eNB_1, and at the same time, the uplink transmission of UE_1 may also interfere the downlink reception of UE_2 at the UE sides; and if the TDD working frequency band of eNB_2 is adjacent to the FDD downlink frequency band of eNB_1, the downlink transmission of eNB_1 may interfere the uplink reception of eNB_2 and the uplink transmission of UE_2 may interfere the downlink reception of UE_1.

To avoid the adjacent-band interference between the TDD system and the FDD system, as shown in FIG. 3, a Guard Band (GB) can be arranged between the FDD and TDD frequency bands but is not available for neither the TDD system nor the FDD system; due to the existence of the GB, there will be a space between the working frequency bands of the LTE FDD system and the LTE TDD system to avoid the adjacent-band interference; whereas, the unavailability of the GB for any system may cause the waste of spectrum resources and is not favourable for the development and popularization and application of TDD technology. Therefore, the interference between frequency bands and the waste of spectrum resources are the primary problems for the coexistence of the FDD system and TDD system of the LTE.

In the LTE, one UE is served by only one Component Carrier (CC) and there is only one component carrier in each cell. The cell corresponding to the component carrier serving the UE is the serving cell of the UE, by which the UE is provided with a series of functions, including secure input, Non Access Stratum (NAS) mobile information, radio link detection, paging and the like. With the gradual advancement of the LTE standard, carrier aggregation technology has become a significant feature of the LTE-Advanced standard. In the carrier aggregation technology, each eNB may be configured with multiple Component Carriers (CC) and the UE may also be configured with and utilize multiple member carriers, including primary component carriers and secondary component carriers. The primary component carrier is the one providing a complete service to the UE in the carrier aggregation, namely, without secondary component carrier, the UE can work normally only by the primary component carrier. The secondary component carrier is introduced to the LTE-Advanced standard to expand the operation bandwidth of the LTE equipment and improve the throughput and cannot provide a complete service to the UE nor exist separately without the primary component carrier. The UE aggregating multiple component carriers may perform transmission and reception on the component carriers. As shown in FIG. 4, UE_1 is configured with three component carriers f1, f2 and f3, and UE_2 is configured with two component carriers f4 and f5, where fn (n is a positive integer), represents carriers of different frequencies. In the carrier frequency band of the LTE, some TDD and FDD carriers may be adjacent to one other in frequency, so these carriers may interfere with one another to cause the LTE system not to work normally and affect the user experience.

For the LTE technology, the implementation of the coexistence of the FDD and TDD systems is confronted with the problems of interference between frequency bands and waste of spectrum resources, which also affect the implementation of carrier aggregation in the LTE-Advanced standard.

SUMMARY

In view of this, the main purpose of the disclosure is to provide a method and a system for providing a service from a TDD cell to a terminal, in order to solve the problems of interference between frequency bands and waste of spectrum resources for the coexistence of an FDD system and a TDD system.

To achieve the purpose above, the technical scheme of the disclosure is implemented as follows.

The disclosure provides a method for providing a service from a TDD cell to a terminal, which includes:

configuring a cell of which frequency bands can interfere a Frequency Division Duplex (FDD) uplink frequency band and a cell of which frequency bands can interfere an FDD downlink frequency band in cells provided by an eNB as an uplink cell only for transmitting uplink data and a downlink cell only for transmitting downlink data respectively on an evolved NodeB (eNB) of a TDD system in advance, and storing configuration information of the uplink and downlink cells in the eNB; transmitting the configuration information of the uplink and downlink cells to a User Equipment (UE) by the eNB; and receiving, by the UE, the configuration information of the uplink and downlink cells, and transmitting data with the eNB by at least one of the uplink and downlink cells.

In the scheme, the step of storing configuration information of the uplink and downlink cells in the eNB may include: storing, by the eNB, the configuration information of respective uplink cells as an uplink cell list, and storing the configuration information of respective downlink cells as a downlink cell list.

In the scheme, the step of transmitting the configuration information of the uplink and downlink cells to a UE by the eNB may include: transmitting, by the eNB, the configuration information of the uplink and downlink cells to the UE through any one or more pieces of system information.

In the scheme, the step of transmitting the configuration information of the uplink and downlink cells to the UE through any one or more pieces of system information by the eNB may include: adding, by the eNB, the uplink cell list containing the configuration information of all the uplink cells and the downlink cell list containing the configuration information of all the downlink cells into any one or more pieces of system information, and broadcasting the system information periodically.

In the scheme, the step of transmitting the configuration information of the uplink cell to a UE by the eNB may include: transmitting, by the eNB, the configuration information of the uplink cell to the UE through a Radio Resource Control (RRC) message.

In the scheme, the step of transmitting the configuration information of the uplink cell to the UE through the RRC message by the eNB may include:

adding, by the eNB, the uplink cell list containing the configuration information of respective uplink cells into an RRC connection setup message sent to the UE in an RRC setup process; or, adding the uplink cell list containing the configuration information of respective uplink cells into an RRC connection reconfiguration message sent to the UE during adding a secondary Serving Cell (SCell).

In the scheme, the step of receiving the configuration information and then transmitting data with the eNB by the UE may include:

sending, by the UE, uplink data to the eNB through the uplink cell, and receiving, by the eNB, the uplink data from the UE through the uplink cell; and/or, sending, by the UE, downlink data to the UE through the downlink cell, and receiving, by the UE, the downlink data from the eNB through the downlink cell.

In the scheme, the method may further include:

for each configured downlink cell, setting, by the eNB, a cellBarred value of System Information Block 1 (SIB_1) in the system information of each downlink cell to "barred", not containing any one or more of a Master Information Block (MIB)/SIB_1/SIB_2 in the system information of each downlink cell, or adding a flag for indicating that the cell is the downlink cell in the system information of each downlink cell;

then, broadcasting the system information of each downlink cell by the eNB periodically; receiving, by the UE, the system information of the current cell during selection or reselection of the cell, and then judging whether the cellBarred value of SIB_1 in the system information of current cell is "barred", or whether the system information of the current cell lacks any one or more of MIB/SIB_1/SIB_2, or whether the system information of the current cell contains the flag for indicating that the cell is the downlink cell; if so, not camping on the current cell, otherwise, camping on the current cell after the selection or reselection of the current cell.

In the scheme, the method may further include:

after receiving the configuration information of the uplink cell, judging, by the UE, whether the current cell is the uplink cell according to the configuration information, if so, not measuring and reporting the current cell, otherwise, measuring and reporting the current cell.

The disclosure further provides a system for providing a service from a TDD cell to a terminal, which includes: a TDD evolved NodeB (eNB) and a TDD User Equipment (UE), wherein a cell of which frequency bands can interfere a Frequency Division Duplex (FDD) uplink frequency band and a cell of which frequency bands can interfere an FDD downlink frequency band are respectively configured as an uplink cell only for transmitting uplink data and a downlink cell only for transmitting downlink data on the TDD eNB in advance, and the TDD eNB is configured to store configuration information of the uplink and downlink cells, and to transmit the configuration information of the uplink and downlink cells to the TDD UE; and the TDD UE is configured to receive the configuration information of the uplink and downlink cells sent from the TDD eNB, and to transmit data with the TDD eNB by at least one of the uplink and downlink cells.

In the scheme, the TDD eNB may be configured to receive uplink data sent from the TDD UE by the uplink cell, and/or to send downlink data to the TDD UE by the downlink cell; and.

the TDD UE may be configured to send uplink data to the TDD eNB by the uplink cell, and/or to receive downlink data sent from the TDD eNB by the downlink cell.

In the scheme, the TDD eNB may be configured to set a cellBarred value of SIB_1 in system information of each downlink cell to "barred", not contain any one or more of MIB/SIB_1/SIB_2 in the system information of each downlink cell, or add a flag for indicating that the cell is the downlink cell in the system information of each downlink cell, and broadcast the system information periodically; and the TDD UE may be configured to receive the system information of the current cell broadcast by the TDD eNB during selection or reselection of the cell, and then judge whether the cellBarred value of SIB_1 in the system information of the current cell is "barred", or whether the system information of the current cell lacks any one or more of MIB/SIB_1/SIB_2, or whether the system information of the current cell contains the flag for indicating that the cell is the downlink cell; if so, the TDD UE does not camp on the current cell, otherwise, the TDD UE camps on the current cell after the selection or reselection of the current cell.

In the scheme, the TDD UE may be configured to, after receiving the configuration information of the uplink cell from the TDD eNB, judge whether the current cell is the uplink cell according to the configuration information, if so, the TDD UE does not measure and report the current cell, otherwise, the TDD UE measures and reports the current cell.

By the method for providing the service from the TDD cell to the terminal, the cells of which the frequency bands interfere the FDD frequency band are configured as the uplink cells only for transmitting uplink data or the downlink cells only for transmitting downlink data, so that the eNB and the UE can transmit data using the adjacent cells of the TDD system and the FDD system, which not only avoids the interference between the frequency bands of the FDD and TDD systems and implements the coexistence of the FDD and TDD systems, but also fully utilizes the spectrum resources, ensures the high utilization rate of the spectrum resources and saves resources.

BRIEF DESCRIPTION OF THE DRAWINGS

FIG. 5 is a flowchart of a method for providing a service from a TDD cell to a terminal of the disclosure;

FIG. 6 is a diagram showing frequency bands of an uplink cell and a downlink cell configured; and FIG. 7 is a flowchart of selecting or reselecting a cell by a UE of LTE TDD.

DETAILED DESCRIPTION

Figure 1:
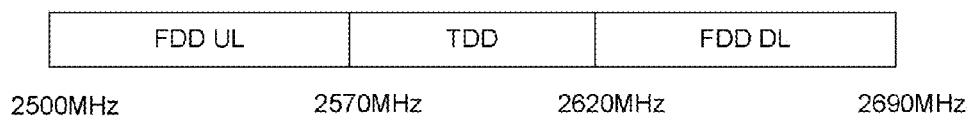
FIG. 1 is a diagram showing frequency bands of FDD and TDD in an LTE system.
Figure 2:
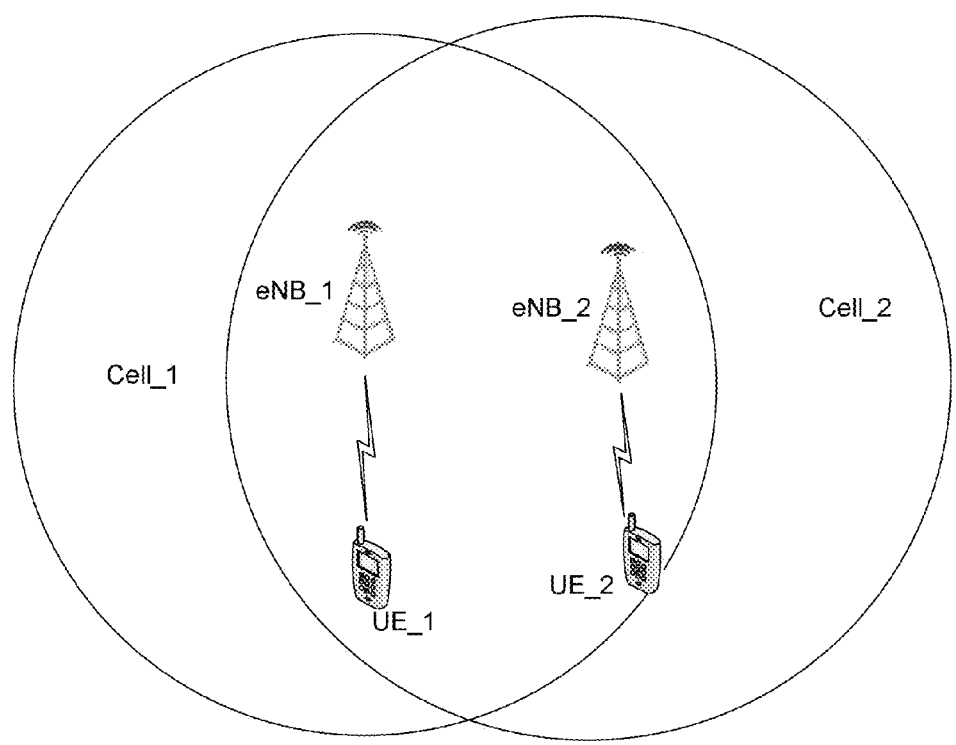
FIG. 2 is a diagram showing a network scenario in which FDD and TDD coexist in LTE.
Figure 3:
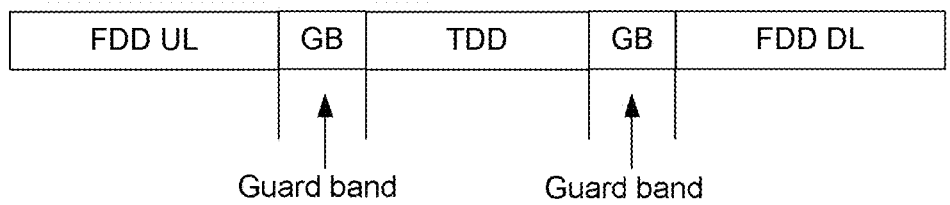
FIG. 3 is a diagram showing a guard band.
Figure 4:
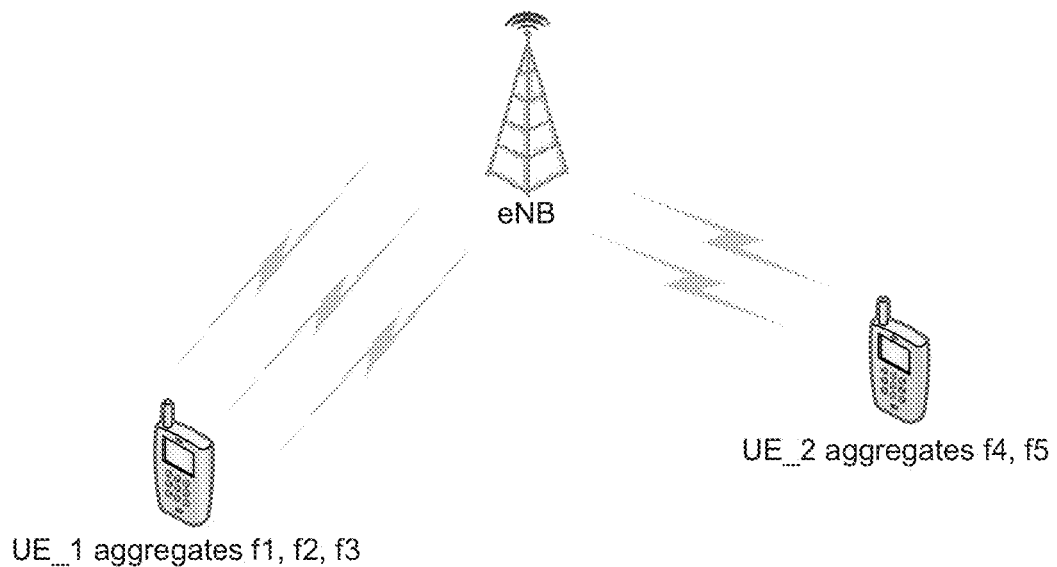
FIG. 4 is a diagram showing a network scenario in which carrier aggregation technology is adopted.

To implement the coexistence of an FDD system and a TDD system, avoid interference between different frequency bands and enable both the FDD system and the TDD system to work normally, the disclosure provides a method for providing a service from a TDD cell to a terminal, which includes:

Step 501: a cell of which frequency bands can interfere an FDD uplink frequency band and a cell of which frequency bands can interfere an FDD downlink frequency band in cells provided by an eNB are respectively configured as an uplink cell only for transmitting uplink data and a downlink cell only for transmitting downlink data on the eNB of a TDD system in advance, and configuration information of the uplink and downlink cells is stored in the eNB; the eNB transmits the configuration information of the uplink and downlink cells to a UE.

Step 502: The UE receives the configuration information of the uplink and downlink cells and transmits data with the eNB by at least one of the uplink and downlink cells.

In Step 501, the process that a cell of which frequency bands can interfere an FDD uplink frequency band is configured as an uplink cell only for transmitting uplink data specifically includes: for carriers provided by the eNB, a carrier of which TDD frequency bands can interfere the FDD uplink frequency band is configured as a component carrier only for transmitting uplink data, and a cell corresponding to the carrier is the uplink cell only for receiving the uplink data. Specifically, the eNB can stop a sending function and only start a receiving function of the component carrier to implement the configuration.

For the carriers provided by the eNB, the process that a cell of which frequency bands can interfere an FDD downlink frequency band is configured as a downlink cell only for transmitting downlink data specifically includes: a carrier of which TDD frequency bands can interfere the FDD downlink frequency band is configured as a carrier only for transmitting downlink data on the eNB of the TDD system in advance, and a cell corresponding to the component carrier is the downlink cell only for sending the downlink data. Specifically, the eNB can stop the receiving function and only start the sending function of the component carrier to implement the configuration.

The process that configuration information of the uplink and downlink cells is stored in the eNB may specifically include: the eNB stores the configuration information of respective uplink cells in the cells provided thereby as an uplink cell list; and the eNB stores the configuration information of respective downlink cells in the cells provided thereby as a downlink cell list. Or, the configuration information of all the uplink and downlink cells is stored as an interference cell list.

Here, the configuration information of the uplink cell contains: related parameters of the carriers corresponding to respective uplink cells, information indicating that only the transmission of uplink data is supported, cell flag and other information. Similarly, the configuration information of the downlink cell may contain: related parameters of the carriers corresponding to respective downlink cells, information indicating that only the transmission of downlink data is supported, cell flag and other information.

The related parameters of the carriers may include frequency bands and other parameters of the carriers.

In Step 501, the process that the eNB transmits the configuration information of the uplink and downlink cells to a UE may include: the eNB may transmit the configuration information of the uplink and downlink cells to the UE by one or more pieces of system information.

Specifically, the eNB may add the uplink cell list containing the configuration information of all the uplink cells and the downlink cell list containing the configuration information of all the downlink cells into one or more pieces of system information and broadcasts the system information periodically. Or, the eNB can add the interference cell list containing the configuration information of respective uplink cells and downlink cells into one or more pieces of system information, and broadcasts the system information periodically.

Here, the process that the eNB transmits the configuration information of the uplink cell to a UE may further include: the eNB transmits the configuration information of the uplink cell to the UE by an RRC message.

Specifically, in a Radio Resource Control (RRC) setup process, the eNB adds the uplink cell list containing the configuration information of respective uplink cells into an RRC connection setup message sent to the UE, or, during adding a secondary Serving Cell (SCell), the eNB adds the uplink cell list containing the configuration information of respective uplink cells into an RRC connection reconfiguration message sent to the UE.

In Step 502, the process that the UE receives the configuration information and then transmits data with the eNB may include: the UE sends uplink data to the eNB by the uplink cell, and the eNB receives the uplink data from the UE by the uplink cell; and/or, the eNB sends downlink data to the UE by the downlink cell, and the UE receives the downlink data from the eNB by the downlink cell.

The method may further include: for each configured downlink cell, the eNB sets a cellBarred value of System Information Block Type1 (SIB_1) in the system information of each downlink cell to "barred", or the system information of each downlink cell does not contain any one or more of a Master Information Block (MIB)/SIB_1/SIB_2, or adds a flag for indicating that the cell is the downlink cell in the system information of each downlink cell; then, the eNB broadcasts the system information of each downlink cell periodically; the UE receives the system information of the current cell during the selection or reselection of the cell and then judges whether to camp here according to the received system information of the current cell, so as to prevent itself from selecting and reselecting the downlink cell; therefore, the TDD UE only camps in the TDD cell which is neither the uplink cell nor the downlink cell when in an idle status.

Specifically, the UE judges whether the cellBarred value of SIB_1 in the system information of the current cell is "barred", or whether the system information of the current cell lacks any one or more of MIB/SIB_1/SIB_2, or whether the system information of the current cell contains the flag for indicating that the cell is the downlink cell; if so, the UE does not camp on the current cell; otherwise, the UE camps on the current cell after the selection or reselection of the current cell.

After the UE receives the configuration information, the method may further include: after receiving the configuration information, the UE judges whether the current cell is the uplink cell according to the configuration information; if so, the current cell is not measured and reported; otherwise, the current cell is measured and reported.

Specifically, after receiving the configuration information, the UE sets an uplink cell flag bit, which is used for indicating that the cell can be only used for transmitting the uplink data, for each uplink cell in the list according to the uplink cell list in the configuration information; before measuring and reporting the current cell, the UE verifies whether the current cell is provided with the uplink cell flag bit; if so, it refuses to measure and report the current cell; otherwise, it measures and reports the current cell.

Correspondingly, the disclosure further provides a system for providing a service from a TDD cell to a terminal, including: a TDD eNB and a TDD UE, wherein a cell of which frequency bands can interfere an FDD uplink frequency band and a cell of which frequency bands can interfere an FDD downlink frequency band are respectively configured as an uplink cell only for transmitting uplink data and a downlink cell only for transmitting downlink data on the TDD eNB in advance, and the TDD eNB is configured to store configuration information of the uplink and downlink cells, and to transmit the configuration information of the uplink and downlink cells to the TDD UE; and the TDD UE is configured to receive the configuration information of the uplink and downlink cells sent from the TDD eNB, and to transmit data with the TDD eNB by at least one of the uplink and downlink cells.

Specifically, the TDD eNB is configured to receive uplink data sent from the TDD UE by the uplink cell, and/or to send downlink data to the TDD UE by the downlink cell; the TDD UE is configured to send uplink data to the TDD eNB by the uplink cell, and/or to receive downlink data sent from the TDD eNB by the downlink cell.

The TDD eNB can be further configured to set a cellBarred value of SIB_1 in system information of each downlink cell to "barred", not contain any one or more of MIB/SIB_1/SIB_2 in the system information of each downlink cell, or add a flag for indicating that the cell is the downlink cell in the system information of each downlink cell, and to broadcast the system information periodically; and the TDD UE is further configured to receive the system information of the current cell broadcast by the TDD eNB during the selection or reselection of the cell, and then judge whether to camp here according to the received system information of the current cell.

Here, the TDD UE may be further configured to, after receiving the configuration information of the uplink cell sent from the TDD eNB, judge whether the current cell is the uplink cell according to the configuration information, if so, not to measure and report the current cell, otherwise, to measure and report the current cell.

In the actual application, in the method for providing the service from the TDD cell to the terminal, the process of configuring the uplink and downlink cells on the TDD eNB is specifically as follows:

As shown in FIG. 6, in the LTE TDD frequency band, the TDD CC of which the frequency band is adjacent to the LTE FDD uplink frequency band is set to a CC only supporting the transmission of uplink data (UL only CC); and the TDD CC of which the frequency band is adjacent to the LTE FDD downlink frequency band is set to a CC only supporting the transmission of downlink data (DL only CC). Here, the UL only CC is a TDD CC which is adjacent to an LTE FDD uplink CC in frequency band and can cause interference therebetween, and generally, it is a TDD CC of which the frequency band is adjacent to the LTE FDD uplink frequency band. Here, the DL only CC is a TDD CC which is adjacent to an LTE FDD downlink CC in frequency band and can cause interference therebetween, and generally, it is a TDD CC of which the frequency band is adjacent to the LTE FDD downlink frequency band. Therefore, for the LTE TDD eNB, only the uplink data can be transmitted on the cell corresponding to the UL only CC, and the downlink subframe is closed. During the closed subframe period, no data is transmitted and received, and the cell corresponding to the UL only CC is the uplink cell. Only the downlink data is transmitted in the cell corresponding to the DL only CC, the uplink subframe is closed and the cell corresponding to the DL only CC is the downlink cell. Therefore, the TDD cell of which the frequency band is adjacent to the FDD uplink frequency band is set as the uplink cell, and the eNB closes a downlink channel of the uplink cell to only receive uplink data from the UE in the uplink cell; furthermore, the TDD cell of which the frequency band is adjacent to the FDD downlink frequency band is set to a downlink cell, and the eNB closes an uplink channel of the downlink cell to only transmit downlink data to the UE in the downlink cell; and the TDD UE only sends uplink data and does not receive downlink data in the uplink cell, but on the contrary, the TDD UE only receives downlink data and does not send uplink data in the downlink cell.

In the actual application, if aggregating the UL only CC, the UE only performs uplink sending on the UL only CC, and downlink reception is stopped to avoid mutual interference between the UE and the FDD uplink CC; if aggregating the DL only CC, the UE only performs downlink reception on the DL only CC, and the uplink sending is stopped to avoid mutual interference between the UE and the FDD uplink CC.

Through the configuration of the uplink cell and the downlink cell, the UL only CC and the DL only CC can be only configured as the SCCs of the UE rather than the PCCs during carrier aggregation.

Here, the UL only CC and the DL only CC in the TDD frequency band are only limited to the TDD CC of which the frequency band is adjacent to the FDD frequency band in the carrier aggregation; in case of the coexistence of the FDD and TDD systems, any TDD CC of which the frequency band interferes the FDD frequency band can be set as the UL only CC or DL only CC by the method, and any TDD cell of which the frequency band can interfere the FDD frequency band can be set as a UL only cell or a DL only cell.

In the actual application, the process that the eNB sends the configuration information of the uplink cells to the UE by the RRC message can be implemented by the following two schemes:

Scheme I: the eNB sends the configuration information of the uplink cell to the UE by an RRC connection setup message in an RRC setup process, specifically: the UE sends an RRC connection request message to the eNB; after receiving the RRC connection request message from the UE, the eNB sends an RRC connection setup message to the UE, wherein the RRC connection setup message includes the configuration message of the uplink cell, specifically, the RRC connection setup message may contain an uplink only cell list which contains index values of respective uplink cells and frequency bands of the corresponding component carriers; the UE receives the RRC connection setup message from the eNB, extracts the configuration information of the uplink cell from the RRC connection setup message and then returns an RRC connection setup complete message to the eNB.

Scheme II: The eNB sends the configuration information of the uplink cell to the UE by a dedicated radio resource control part in an RRC connection reconfiguration message during the addition of SCell, specifically: the eNB sends the RRC connection reconfiguration message to the UE to add SCell into the UE, wherein the RRC connection reconfiguration message includes the configuration information of the uplink cell, for example, the dedicated radio resource control part of the RRC connection reconfiguration message includes an uplink only cell list containing index values of respective uplink cells and frequency bands of the corresponding component carriers; and the UE receives the RRC connection reconfiguration message from the eNB, extracts the configuration information of the uplink cell from the RRC connection reconfiguration message and performs configuration for the addition of SCell according to the RRC connection reconfiguration message.

In the actual application, the cell selection or cell reselection process of the LTE TDD UE based on the method for providing the service from the TDD cell to the terminal includes:

the UE in the idle status needs to perform cell selection or reselection; firstly, it searches for and synchronizes cells, specifically, it searches for all the frequency bands to find a cell with the strongest signal in respective frequency bands; once finding the cell which can provide a service normally, it camps here. If finding a downlink cell, the UE does not camp here. Because no downlink data is transmitted in an uplink cell, the UE cannot sense the existence of the uplink cell so as not to select it and camp here.

There are three modes for preventing the UE from selecting or reselecting the downlink cell.

1. The cellBarred value in SIB_1 in the system information of the downlink cell is set as "barred" so that the UE reads the "barred" cellBarred value in SIB_1 in the system information of the cell when finding the downlink cell and accordingly does not select the downlink cell nor camp on the downlink cell.

2. The system information of the downlink cell does not contain any one or more of MIB/SIB_1/SIB_2 so that the UE reads no MIB/SIB_1/SIB_2 in the system information of the cell when finding the downlink cell and accordingly does not select the downlink cell nor camp on the downlink cell.

3. The system information of the downlink cell includes a downlink cell flag for indicating that the cell only supports the transmission of downlink data so that the UE reads the downlink cell flag contained in the system information of the cell when finding the downlink cell and accordingly does not select the downlink cell nor camp on the downlink cell. Specifically, the downlink cell flag can be added into SIB_1 or other SIBs in the system information.

As shown in FIG. 7, the cell selection or reselection process of the LTE TDD UE is specifically as follows:

Step 701: A UE finds a current TDD cell.

Step 702: The UE acquires system information of the current TDD cell and judges whether it is possible to camp on the current TDD cell according to the acquired system information.

Specifically, the UE can judge whether the system information of the current TDD cell meets any one or more of the following three judgement criteria, if not, the UE does not select or reselect the current TDD cell and step 703 is executed, otherwise, step 704 is executed:

(1) the cellBarred value in SIB_1 in the system information of the cell is "barred";

(2) the system information of the cell lacks one or more of MIB/SIB_1/SIB_2; and (3) the system information of the cell includes the downlink cell flag.

Step 703: The UE continues to search for other TDD cells and step 701 is executed again to repeat the process above.

Step 704: The UE selects or reselects the current TDD cell and camps here.

In the actual application, based on the TDD cell service method of the disclosure, the process of measuring and reporting the cell by the LTE TDD UE can be implemented as follows: the UE receives the configuration information of the uplink cell sent from the eNB, such as the uplink only cell list from the eNB, and sets an uplink only flag, which is used for indicating that the cell can be only used for the transmission of the uplink data, for each uplink cell according to the configuration information of the uplink cell, or, it can configure an uplink only flag for each serving cell; if the value of the uplink only flag corresponding to the serving cell is not set, indicating that the cell is not an uplink cell, a measurement and reporting event can be triggered. If the UE is configured with a measurement and reporting triggering event A1/A2/A6, the measurement value of a serving cell meets the threshold value of the event A1/A2/A6, and the uplink only flag corresponding to the serving cell is not set, namely, the cell is not an uplink cell, the measurement and reporting of the event A1/A2/A6 are triggered.

What said above are only preferred embodiments of the disclosure, and not intended to limit the scope of protection of the disclosure.

INDUSTRIAL APPLICABILITY

By the method for providing the service from the TDD cell to the terminal, a cell of which frequency bands interfere an FDD frequency band is configured as an uplink cell only for transmitting uplink data or a downlink cell only for transmitting downlink data, so that an eNB and a UE can transmit data using the adjacent cells of the TDD system and the FDD system, which not only avoids interference between frequency bands of the FDD and TDD systems and implements coexistence of the FDD and TDD systems, but also fully utilizes spectrum resources, ensures the high utilization rate of the spectrum resources and saves resources.

What is claimed is:

1. A method for providing a service, comprising:
configuring a cell of which frequency bands can interfere a Frequency Division Duplex (FDD) uplink frequency band and a cell of which frequency bands can interfere an FDD downlink frequency band in cells provided by an eNB as an uplink cell only for transmitting uplink data and a downlink cell only for transmitting downlink data respectively on an evolved NodeB (eNB) of a TDD system in advance, and storing configuration information of the uplink and downlink cells in the eNB; transmitting, by the eNB, the configuration information of the uplink and downlink cells; and transmitting, by the eNB, data through at least one of the uplink and downlink cells;

wherein the configuring a cell of which frequency bands can interfere an FDD uplink frequency band as an uplink cell only for transmitting uplink data on an eNB of a TDD system in advance comprises: for carriers provided by the eNB, a carrier of which TDD frequency bands interfere the FDD uplink frequency band is configured as a component carrier only for transmitting uplink data, and a cell corresponding to the carrier is the uplink cell only for receiving the uplink data; and the configuring a cell of which frequency bands can interfere an FDD downlink frequency band in cells provided by an eNB as a downlink cell only for transmitting downlink data on an eNB of a TDD system in advance comprises: a carrier of which TDD frequency bands interfere the FDD downlink frequency band is configured as a carrier only for transmitting downlink data on the eNB of the TDD system in advance, and a cell corresponding to the component carrier is the downlink cell only for sending the downlink data.

2. The method according to claim 1, wherein the step of storing configuration information of the uplink and downlink cells in the eNB comprises: storing, by the eNB, the configuration information of respective uplink cells as an uplink cell list, and storing the configuration information of respective downlink cells as a downlink cell list.

3. The method according to claim 1, wherein the step of transmitting the configuration information of the uplink and downlink cells by the eNB comprises: transmitting, by the eNB, the configuration information of the uplink and downlink cells through any one or more pieces of system information.

4. The method according to claim 2, wherein the step of transmitting the configuration information of the uplink and downlink cells by the eNB comprises: transmitting, by the eNB, the configuration information of the uplink and downlink cells through any one or more pieces of system information.

5. The method according to claim 3, wherein the step of transmitting the configuration information of the uplink and downlink cells through any one or more pieces of system information by the eNB comprises: adding, by the eNB, the uplink cell list containing the configuration information of all the uplink cells and the downlink cell list containing the configuration information of all the downlink cells into any one or more pieces of system information, and broadcasting the system information periodically.

6. The method according to claim 4, wherein the step of transmitting the configuration information of the uplink and downlink cells through any one or more pieces of system information by the eNB comprises: adding, by the eNB, the uplink cell list containing the configuration information of all the uplink cells and the downlink cell list containing the configuration information of all the downlink cells into any one or more pieces of system information, and broadcasting the system information periodically.

7. The method according to claim 1, wherein the step of transmitting the configuration information of the uplink cell by the eNB comprises: transmitting, by the eNB, the configuration information of the uplink cell through a Radio Resource Control (RRC) message.

8. The method according to claim 2, wherein the step of transmitting the configuration information of the uplink cell by the eNB comprises: transmitting, by the eNB, the configuration information of the uplink cell through a Radio Resource Control (RRC) message.

9. The method according to claim 7, wherein the step of transmitting the configuration information of the uplink cell through an RRC message by the eNB comprises:
in an RRC setup process, adding, by the eNB, the uplink cell list containing the configuration information of respective uplink cells into an RRC connection setup message to be transmitted; or, during adding a secondary Serving Cell (SCell), adding the uplink cell list containing the configuration information of respective uplink cells into an RRC connection reconfiguration message to be transmitted.

10. The method according to claim 8, wherein the step of transmitting the configuration information of the uplink cell through an RRC message by the eNB comprises:
in an RRC setup process, adding, by the eNB, the uplink cell list containing the configuration information of respective uplink cells into an RRC connection setup message to be transmitted; or, during adding a secondary Serving Cell (SCell), adding the uplink cell list containing the configuration information of respective uplink cells into an RRC connection reconfiguration message to be transmitted.

11. The method according to claim 1, wherein the step of transmitting data through at least one of the uplink and downlink cells by the eNB comprises:
receiving, by the eNB, uplink data through the uplink cell; and/or, sending, by the eNB, downlink data through the downlink cell.

12. The method according to claim 1, further comprising:
for each configured downlink cell, setting, by the eNB, a cellBarred value of System Information Block 1 (SIB_1) in the system information of each downlink cell to "barred", not containing any one or more of a Master Information Block (MIB)/SIB_1/SIB_2 in the system information of each downlink cell, or adding a flag for indicating that the cell is the downlink cell in the system information of each downlink cell;
then, broadcasting, by the eNB, the system information of each downlink cell periodically.

13. The method according to claim 11, further comprising:
for each configured downlink cell, setting, by the eNB, a cellBarred value of System Information Block 1 (SIB_1) in the system information of each downlink cell to "barred", not containing any one or more of a Master Information Block (MIB)/SIB_1/SIB_2 in the system information of each downlink cell, or adding a flag for indicating that the cell is the downlink cell in the system information of each downlink cell;
then, broadcasting, by the eNB, the system information of each downlink cell periodically.

14. A method for providing a service, comprising:
receiving, by the UE, configuration information of uplink and downlink cells, and transmitting data by at least one of the uplink and downlink cells;
wherein the uplink cell is a cell in a TDD system, of which frequency bands can interfere a Frequency Division Duplex (FDD) uplink frequency band and only for transmitting uplink data; the downlink cell is a cell in the TDD system, of which frequency bands can interfere an FDD downlink frequency band and only for transmitting downlink data;

wherein the uplink cell corresponds to a carrier, provided by an eNB, of which TDD frequency bands interfere the FDD uplink frequency band and which is a component carrier only for transmitting uplink data; and the downlink cell corresponds to a carrier of which TDD frequency bands interfere the FDD downlink frequency band and which is a component carrier only for transmitting downlink data.

15. The method according to claim 14, wherein the step of receiving configuration information and then transmitting data by the UE comprises:
sending, by the UE, uplink data through the uplink cell; and/or, receiving, by the UE, the downlink data through the downlink cell.

16. The method according to claim 14, further comprising:
for each configured downlink cell, receiving, by the UE, system information of a current cell during selection or reselection of a cell, and then judging whether a cellBarred value of System Information Block 1 (SIB_1) in the system information of the current cell is "barred", or whether the system information of the current cell lacks any one or more of a Master Information Block (MIB)/SIB_1/SIB_2, or whether the system information of the current cell contains a flag for indicating that the cell is the downlink cell; if so, not camping on the current cell, otherwise, camping on the current cell after the selection or reselection of the current cell.

17. The method according to claim 15, further comprising:
for each configured downlink cell, receiving, by the UE, system information of a current cell during selection or reselection of a cell, and then judging whether a cellBarred value of System Information Block 1 (SIB_1) in the system information of the current cell is "barred", or whether the system information of the current cell lacks any one or more of a Master Information Block (MIB)/SIB_1/SIB_2, or whether the system information of the current cell contains a flag for indicating that the cell is the downlink cell; if so, not camping on the current cell, otherwise, camping on the current cell after the selection or reselection of the current cell.

18. The method according to claim 14, further comprising:
after receiving the configuration information of the uplink cell, judging, by the UE, whether a current cell is the uplink cell according to the configuration information, if so, not measuring and reporting the current cell, otherwise, measuring and reporting the current cell.

19. The method according to claim 15, further comprising:
after receiving the configuration information of the uplink cell, judging, by the UE, whether a current cell is the uplink cell according to the configuration information, if so, not measuring and reporting the current cell, otherwise, measuring and reporting the current cell.

20. A device for providing a service, comprising: a TDD User Equipment (UE) configured to receive configuration information of uplink and downlink cells, and to transmit data by at least one of the uplink and downlink cells;
wherein the uplink cell is a cell in a TDD system, of which frequency bands can interfere a Frequency Division Duplex (FDD) uplink frequency band and only for transmitting uplink data; the downlink cell is a cell in the TDD system, of which frequency bands can interfere an FDD downlink frequency band and only for transmitting downlink data;
wherein the uplink cell corresponds to a carrier, provided by an eNB, of which TDD frequency bands interfere the FDD uplink frequency band and which is a component carrier only for transmitting uplink data; and the downlink cell corresponds to a carrier of which TDD frequency bands interfere the FDD downlink frequency band and which is a component carrier only for transmitting downlink data.

21. The device according to claim 20, wherein the TDD UE is configured to send uplink data by the uplink cell, and/or to receive downlink data by the downlink cell.

22. The device according to claim 20, wherein
the TDD UE is further configured to receive system information of a current cell during selection or reselection of a cell, and then judge whether a cellBarred value of System Information Block 1 (SIB_1) in the system information of the current cell is "barred", or whether the system information of the current cell lacks any one or more of a Master Information Block (MIB)/SIB_1/SIB_2, or whether the system information of the current cell contains the flag for indicating that the cell is the downlink cell; if so, the TDD UE does not camp on the current cell, otherwise, the TDD UE camps on the current cell after the selection or reselection of the current cell.

23. The device according to claim 21, wherein
the TDD UE is further configured to receive system information of a current cell during selection or reselection of a cell, and then judge whether a cellBarred value of System Information Block 1 (SIB_1) in the system information of the current cell is "barred", or whether the system information of the current cell lacks any one or more of a Master Information Block (MIB)/SIB_1/SIB_2, or whether the system information of the current cell contains the flag for indicating that the cell is the downlink cell; if so, the TDD UE does not camp on the current cell, otherwise, the TDD UE camps on the current cell after the selection or reselection of the current cell.

24. The device according to claim 20, wherein the TDD UE is further configured to, after receiving the configuration information of the uplink cell, judge whether a current cell is the uplink cell according to the configuration information, if so, the TDD UE does not measure and report the current cell, otherwise, the TDD UE measures and reports the current cell.

25. The device according to claim 21, wherein the TDD UE is further configured to, after receiving the configuration information of the uplink cell, judge whether a current cell is the uplink cell according to the configuration information, if so, the TDD UE does not measure and report the current cell, otherwise, the TDD UE measures and reports the current cell.

* * * * *